United States Patent [19]

Kiyoshige et al.

[11] Patent Number: 5,018,317

[45] Date of Patent: May 28, 1991

[54] ABRASIVE WATER JET CUTTING APPARATUS

[75] Inventors: Masanori Kiyoshige; Tomonobu Okada; Takashi Kawashima; Takeshi Hirokawa, all of Hyogo, Japan

[73] Assignee: Kawasaki Jukogyo Kabushiki Kaisha, Kobe, Japan

[21] Appl. No.: 367,714

[22] Filed: Jun. 19, 1989

Related U.S. Application Data

[63] Continuation-in-part of Ser. No. 17,345, Feb. 20, 1987, Pat. No. 4,872,293.

[30] Foreign Application Priority Data

| Feb. 20, 1986 | [JP] | Japan | 61-36072 |
| Apr. 18, 1986 | [JP] | Japan | 61-90398 |
| Jul. 8, 1986 | [JP] | Japan | 61-161268 |
| Jul. 8, 1986 | [JP] | Japan | 61-161269 |
| Sep. 18, 1986 | [JP] | Japan | 61-143415 |
| Sep. 18, 1986 | [JP] | Japan | 61-143416 |
| Nov. 5, 1986 | [JP] | Japan | 61-264778 |

[51] Int. Cl.$^5$ .......................... B24C 5/00; B24C 5/04
[52] U.S. Cl. .......................... 51/410; 51/439; 51/436; 51/424
[58] Field of Search .............. 51/439, 436, 424, 410; 83/53, 177

[56] References Cited

U.S. PATENT DOCUMENTS

| 2,071,472 | 2/1937 | Pletcher | 51/439 |
| 2,801,133 | 7/1957 | Ridley | 51/439 |
| 2,985,050 | 5/1961 | Schwacha | 51/439 |
| 3,888,054 | 6/1975 | Maselli | 51/319 |
| 3,972,150 | 8/1976 | Hart | 51/439 |
| 4,112,797 | 9/1978 | Pearl | 83/177 |
| 4,319,435 | 3/1982 | Suzuki et al. | 51/421 |
| 4,478,368 | 10/1984 | Yie | 51/439 |
| 4,587,772 | 5/1986 | Griffiths | 51/439 |
| 4,648,215 | 3/1987 | Hashish et al. | 51/439 |
| 4,656,791 | 4/1987 | Herrington et al. | 51/410 |
| 4,669,229 | 6/1987 | Ehlbeck | 51/410 |
| 4,669,230 | 6/1987 | Suzuki et al. | 51/415 |
| 4,698,939 | 10/1987 | Hashish | 51/410 |

FOREIGN PATENT DOCUMENTS

| 119338 | 9/1984 | European Pat. Off. |  |
| 192600 | 11/1907 | Fed. Rep. of Germany | 51/439 |
| 59-134664 | 8/1984 | Japan |  |
| 1603090 | 11/1981 | United Kingdom | 51/319 |

Primary Examiner—Robert A. Rose
Attorney, Agent, or Firm—Wenderoth, Lind & Ponack

[57] ABSTRACT

In an apparatus for cutting a work by an abrasive water jet containing abrasive particles, an abrasive suspension such that abrasive particles with an average size of up to about 100 microns are held in suspension in water is supplied to a jet nozzle assembly in which the abrasive suspension is induced by a high pressure ejected water and directed against the work. The ejected water is passed through an ejected water passageway to which is connected an abrasive water orifice of an abrasive water nozzle tip. The abrasive water orifice has an upstream tapered portion the diameter of which gradually increases toward an upstream opening at which the abrasive water orifice is connected smoothly to the downstream end of the ejected water passageway, whereby the flow of ejected water is streamlined. The abrasive suspension is supplied to, and merges with, the streamlined flow of the ejected water near the junction of the ejected water passageway and the abrasive water orifice, as an outer layer of the streamlined flow, whereby a dual-layer streamlined jet is obtained which enables fine cutting and also reduces wear of the nozzle tip.

11 Claims, 7 Drawing Sheets

ABRASIVE WATER JET CUTTING APPARATUS

This is a continuation-in-part application of application Ser. No. 017,345 filed Feb. 20, 1987 and entitled "Abrasive water jet cutting method and apparatus", now U.S. Pat. No. 4,872,293.

BACKGROUND OF THE INVENTION

This invention pertains to apparatus for cutting sheet metal or like work by means of a jet of highly pressurized water containing particles of an abrasive material. Such a jet of water containing abrasive particles is herein referred to as an abrasive water jet.

The cutting of metal or like materials by an abrasive water jet per se is not new and has been extensively practiced for some time now. As the abrasive particles there have been employed materials such as silica sand, cast iron grit, or powdered garnet or alumina. The average size of such abrasive particles has heretofore ranged from 0.2 to 0.8 millimeters.

The conventional abrasive water jet cutting practice has been such that highly pressurized water and "dry" abrasive particles are separately delivered to an abrasive water jet nozzle assembly. The abrasive particles merge into the stream of pressurized water within the nozzle assembly. The pressurized water containing the abrasive particles emerges from the nozzle assembly in the form of an abrasive water jet directed against the work. The abrasive water jet cuts the work as the nozzle assembly and work are moved relative to each other.

An objection to this conventional practice is that the abrasive particles are fed in the "dry" state to the nozzle assembly and, in consequence, cannot possibly be reduced in size to such an extent as can be desired. The use of such coarse abrasive particles (from 0.2 to 0.8 millimeters in average size) is undesirable for more reasons than one. First, they give rise to the rapid wear of the nozzle tip and other parts of the nozzle assembly that are exposed to the abrasive particles. Second, the width of cut (kerf) created in the work is very large, usually larger than the orifice diameter of the nozzle tip. An additional problem is the production of burrs on the back of the work. Consequently, the abrasive water jet cutting as heretofore practiced has required subsequent machining operations in applications where close tolerances and fine finishes are important.

U.S. Pat. No. 3,972,150 to Hart teaches the use of a slurry made of a mixture of abrasive material and water for cutting a work. The slurry is induced by and merges into high pressure water jets and is directed against the work to cut the same. Again, the abrasive material used is made of coarse abrasive particles, so that fine cutting with a small width of cut and without the production of burrs cannot be realized.

SUMMARY OF THE INVENTION

It is a primary object of this invention to provide an apparatus for cutting a work by means of an abrasive water jet by which fine or precision cutting can be attained.

Another object of this invention is to provide an apparatus for cutting a work by means of an abrasive water jet wherein a remarkable reduction of wear of the nozzle assembly of the apparatus can be realized with substantial extension of the life of the nozzle assembly.

A further object of this invention is to provide an apparatus for cutting a work by means of an abrasive water jet wherein an abrasive supply line, longer than the one usable heretofore, can be used to supply the abrasive material to the nozzle assembly.

According to this invention, the apparatus for cutting a work by means of an abrasive water jet containing abrasive particles comprises: a source of water under pressure; abrasive suspension supply means for supplying an abrasive suspension such that abrasive particles with an average size of up to about 100 microns are held in suspension in water; and an abrasive water jet nozzle assembly held opposite the work to be cut and communicating with both the pressurized water source and the abrasive suspension supply means, the nozzle assembly mixing the pressurized water and the abrasive suspension for directing the resulting mixture against the work as an abrasive water jet. The jet nozzle assembly includes a nozzle body having a rectilinear through path made up of a water passageway, a water ejecting orifice disposed downstream of the water passageway, an ejected water passageway disposed downstream of such orifice, and an abrasive water orifice disposed downstream of the ejected water passageway. The abrasive water orifice has an upstream opening of a diameter equal to, or slightly smaller than, a diameter of the ejected water passageway. The upstream opening is joined with the ejected water passageway in such a manner that the abrasive water orifice forms a smooth continuation of the ejected water passageway to produce a streamlined flow of the ejected water. The nozzle body further has an abrasive suspension inlet port connected to the abrasive suspension supply means, an annular abrasive suspension chamber disposed around rectilinear through path and connected to the inlet port, and a plurality of abrasive suspension passageways communicatively connecting the abrasive suspension chamber to the area where the ejected water passageway is joined with the upstream opening of the abrasive water orifice. The abrasive suspension passageways are directed toward the upstream opening to supply the abrasive suspension into the upstream opening in the form of an outer layer of streamlined flow of the abrasive suspension, surrounding the streamlined flow of the ejected water, whereby a dual-layer flow of the water and the abrasive suspension is produced through the abrasive water orifice.

The above and other features and advantages of this invention and the manner of realizing them will become more apparent, and the invention itself will best be understood, from a study of the following description and appended claims, with reference had to the attached drawings showing some preferable embodiments of the invention.

DETAILED DESCRIPTION

1. General Construction of Apparatus

The invention will now be described more specifically as adapted for the cutting of sheet metal. Typically, the abrasive water jet cutting apparatus in accordance with the invention may take the form of the arrangement of FIG. 1 or that of FIG. 2. These two different forms of apparatus will be described in succession.

1-1. First Form of Apparatus

Figure 1:
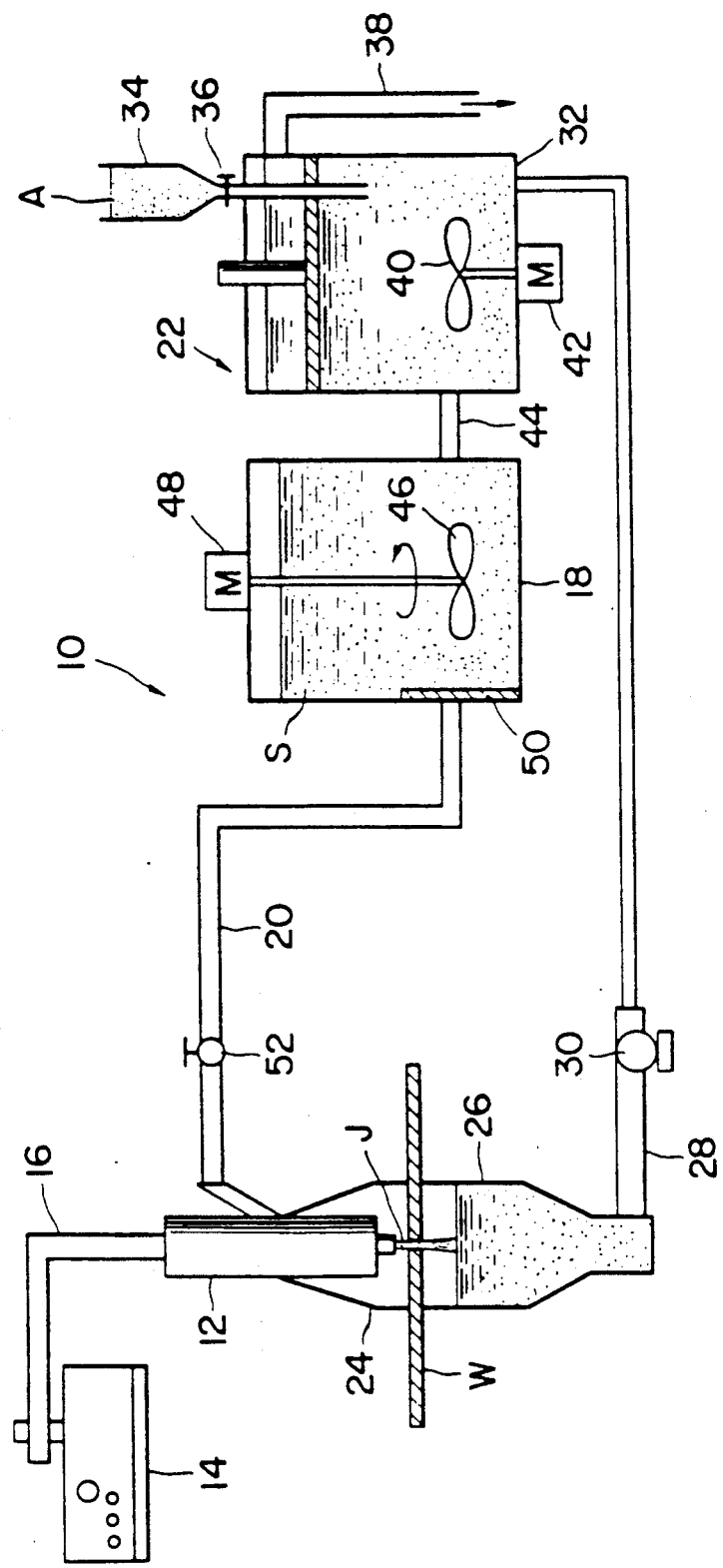
FIG. 1 is a diagrammatic illustration of the general organization of the abrasive water jet cutting apparatus incorporating the novel concepts of this invention.

Generally designated 10, the apparatus of FIG. 1 includes an abrasive water jet nozzle assembly 12 for discharging an abrasive water jet J against a sheet metal work W to be cut. The nozzle assembly 12 communicates with an ultra-high pressure water pump 14 by way of a conduit 16 on one hand and, on the other hand, with an agitation vessel 18 by way of a conduit 20. The agitation vessel 18 forms a part of abrasive suspension supply means 22 from which an abrasive suspension S (i.e. water containing abrasive particles in suspension) is supplied in accordance with the novel concepts of this invention.

The nozzle assembly 12 functions to introduce this abrasive suspension S into the stream of highly pressurized water from the pump 14 and to accelerate and direct the resulting fluid toward the work W as the abrasive water jet J for cutting the work. Some preferred constructions of the nozzle assembly 12 will be described in detail subsequently. A splash guard 24 covers a lower part of the nozzle assembly 12 and extends down onto the surface of the work W.

Disposed opposite the nozzle assembly 12 across the work W is a recovery vessel means 26 for recovering the used abrasive particles by admitting the abrasive water jet J that has cut the work W. The recovery vessel means 26 is herein shown as a simple watertight vessel having an opening in its top for the admission of the abrasive water jet J. A conduit 28 having a pump 30 communicates the recovery vessel means 26 with a concentration control vessel 32 for recirculating the recovered abrasive particles and water.

The concentration control vessel 32 in combination with the agitation vessel 18 constitutes the abrasive suspension supply means 22. A hopper 34 with a gate 36 is mounted on top of the concentration control vessel 32 for metering abrasive particles A therein. An overflow conduit 38 maintains the water in the concentration control vessel 32 at a constant level. The concentration control vessel 32 is shown to be provided with set of agitator blades 40 driven by a motor 42. A conduit 44 communicates the concentration control vessel 32 with the agitation vessel 18.

The agitation vessel 18 is provided with its own agitator blades 46 driven by a motor 48 for stirring the abrasive suspension A and hence for holding the abrasive particles uniformly suspended throughout the body of water within the vessel 18. The agitation vessel 18 has an outlet opening, not shown, adjacent its bottom, which opening is provided with a filter 50 for the elimination of any unduly large abrasive particles or foreign matter. The conduit 20 communicates the outlet opening of the agitation vessel 18 with the abrasive water jet nozzle assembly 12 for conveying the abrasive suspension S from the former to the latter as by gravity. A flow control valve 52 may be provided on the conduit 20 for controlling the rate of delivery of the abrasive suspension A to the nozzle assembly 12.

Despite the showing of FIG. 1, however, the provision of the two separate vessels 18 and 32 is not of absolute necessity. Only one vessel may be employed and furnished with both an agitator and a hopper for providing the abrasive suspension S of desired abrasive concentration.

1-2. Second Form of Apparatus

Figure 2:
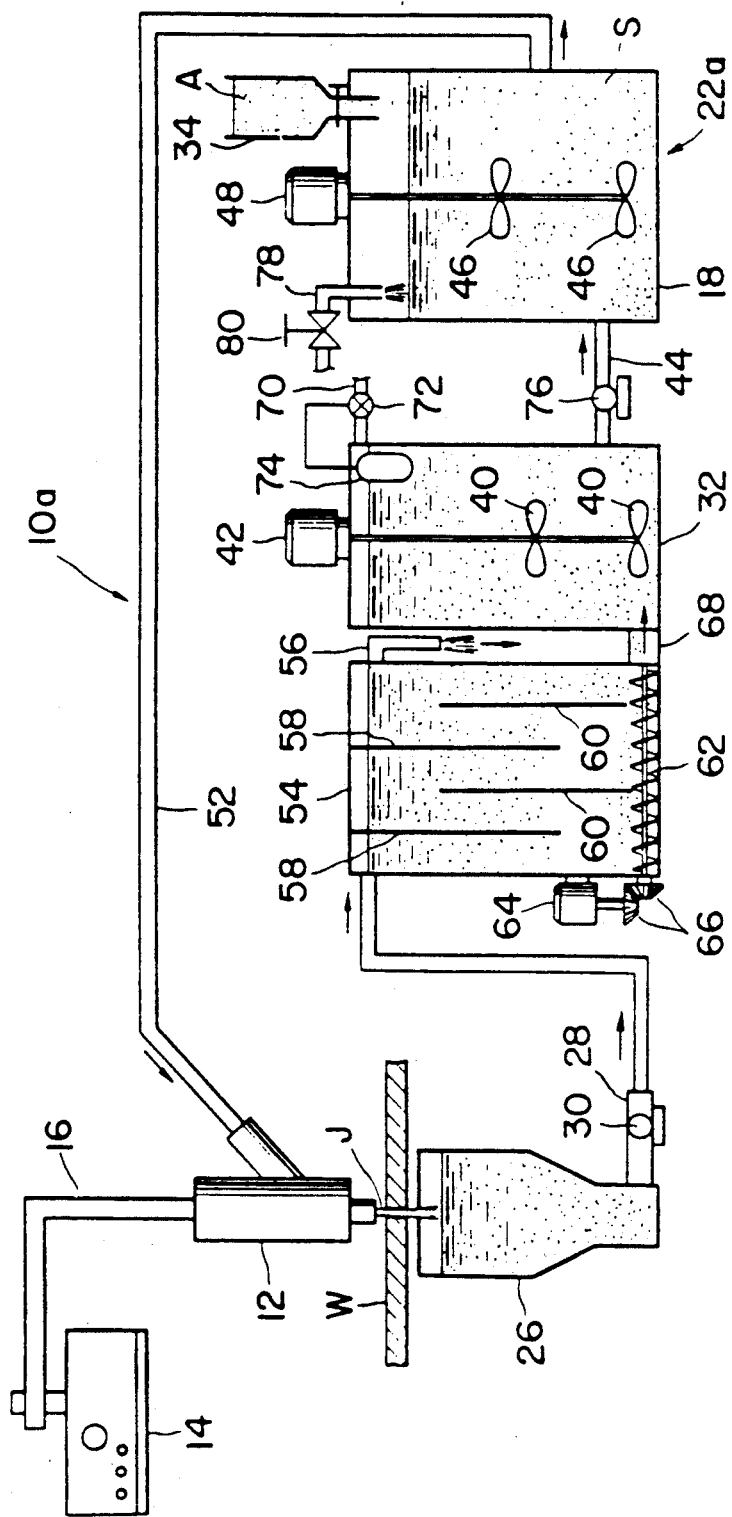
FIG. 2 is similar illustration of an alternative form of the abrasive water jet cutting apparatus in accordance with the invention.

The alternative form of abrasive water jet cutting apparatus 10a shown in FIG. 2 differs from the FIG. 1 apparatus 10 mainly in its abrasive suspension supply means 22a. The modified abrasive suspension supply means 22a has a settling vessel 54 interposed between the recovery vessel means 26 and the concentration control vessel 32. The conduit 28 is coupled to an upper part of the settling vessel 54 for introducing the recovered abrasive particles and water therein. An overflow conduit 56 maintains the level of the fluid constant in the settling vessel 54.

Within the settling vessel 54 two or more baffle plate 58 extend downwardly from its top in parallel spaced relation to each other, whereas another two or more baffle plates 60 extend upwardly from its bottom in parallel spaced relation to each other. The two groups of baffle plates 58 and 60 are in staggered arrangement, defining a meandering path for the fluid pumped from the recovery vessel means 26. As the fluid flows along this meandering path, only the larger sized recovered abrasive particles which are suitable for reuse will settle down to the bottom of the settling vessel 54. Smaller-sized particles which are not suitable for reuse (e.g. less than three microns in the case of alumina) will be discharged with part of the recovered water through the overflow conduit 56.

A screw pump 62 of conventional design is mounted on the bottom of the settling vessel 54 and rotatably extends through the baffle plates 60. Driven by a motor 64 via bevel gearing 66, the screw pump 62 operates to deliver the abrasive particles that have settled to the concentration control vessel 32 via a conduit 68.

The concentration control vessel 32 of this alternative abrasive suspension supply means 22a differs from that of FIG. 1 in not being provided with an abrasive particle hopper but being provided with a water faucet 70 thereby to be fed with fresh water. The water faucet 70 has a solenoid actuated valve 72 which is electrically connected to a hydrometer 74. Measuring the specific gravity of the recovered abrasive suspension within the concentration control vessel 32, the hydrometer 74 makes on-off control of the valve 72 in order to maintain the concentration of the abrasive suspension in the required range. Two sets of motor driven agitator blades 40 are provided within the concentration control vessel 32 substantially as in the FIG. 1 embodiment.

The agitation vessel 18 communicates with the concentration control vessel 32 by way of the conduit 44 which in this alternative embodiment is shown to be provided with a slurry pump 76. The agitation vessel 18 has agitator blades 46 driven by the motor 48 for agitating the abrasive suspension S. Also provided to the agitation vessel 18 are the hopper 34 for supplying fresh abrasive particles A, and a water faucet 78 having a cock 80.

Pumped into the agitation vessel 18 from the concentration control vessel 32, the abrasive suspension S is agitated by the agitator blades 46 so that the abrasive particles may be uniformly dispersed in the water. Since the abrasive concentration of the abrasive suspension S has already been controlled in the concentration control vessel 32, the fresh abrasive particles A and fresh water may be charged as required into the agitation vessel 18 at rates that have been predetermined in relation to each other.

As has been mentioned in connection with the abrasive suspension supply means, the concentration control vessel 32 and agitation vessel 18 could be combined into one. It is also possible to partition one vessel into a settling section and a concentration control section which intercommunicate through an opening in the partition.

2. Operation

The abrasive water jet cutting apparatus 10 of FIG. 1 and the alternative apparatus 10a of FIG. 2 are alike in operation except for the method of recirculation of the used abrasive particles. The particles A of abrasive material such as alumina or silicon carbide, with an average size of not more than 100 microns, may be metered into the concentration control vessel 32 in the FIG. 1 apparatus 10, or into the agitation vessel 18 in the FIG. 2 apparatus 10a, from the hopper 34. The abrasive particles A may be mixed with water in these vessels, and the mixture may be agitated, to provide the desired abrasive suspension S. The abrasive concentration of this abrasive suspension can be anywhere between about 20 and 70 percent by weight.

The maximum permissible average size of the abrasive particles is set at 100 microns for reasons set forth hereinafter. The abrasive concentration of the suspension should be in the range of 20 to 70 percent by weight because should the concentration fall below 20 percent by weight, the resulting abrasive water jet would lose too much of its cutting capability. Should the abrasive concentration exceed 70 percent by weight, on the other hand, then the abrasive suspension would become too solid to be drawn into the abrasive water nozzle assembly 24 by the partial vacuum created therein by the flow of the ejected water therethrough.

With the preparation of the abrasive suspension S completed, the ultrahigh pressure pump 14 may be set into operation to deliver water under high pressure to the abrasive water jet nozzle assembly 12 by way of the conduit 16. The highly pressurized water will flow through the nozzle assembly 12 at such high velocity that the resulting negative pressure will draw the abrasive suspension S into the stream of ejected water.

As will be later referred to in connection with the detailed constructions of the nozzle assembly 12, the abrasive suspension on entering the nozzle assembly will whirl about its axis and so will be sufficiently agitated again immediately before merging into the stream of ejected water.

The rate of delivery of the abrasive suspension S to the nozzle assembly 12 may be controlled by the valve 52 for the utmost efficiency of cutting operation. For instance, if the orifice diameter of the nozzle assembly 12 is two millimeters, and if the abrasive concentration of the abrasive suspension S is 50 percent by weight, then the abrasive suspension may be supplied at a rate of five kilograms per minute. Should the abrasive suspension be supplied at more than this rate, the abrasive water jet J would diverge too much for effective cutting of the sheet metal work W.

The nozzle assembly 12 expels the mixture of the pressurized water from the source 14 and the abrasive suspension S from the supply means 22, in the form of the abrasive water jet J directed against the work W. The work can be cut as either the work or the combination of the nozzle assembly 12 and recovery vessel means 26 is moved relative to the other. The abrasive water jet J on cutting the work is recovered by the recovery vessel means 26 and is pumped therefrom back to the abrasive suspension supply means 22, either directly or via the settling vessel 54.

It has been confirmed that the abrasive particles, once used, hardly change in size or shape and are therefore reusable without any difficulty. The recirculation of the abrasive particles is desirable not only because it realizes economy in the use of the material but also because it makes the disposal of the used material easier than heretofore. A further advantage of the invention is the ease with which the abrasive suspension of the required concentration is prepared and fed to the nozzle assembly. Such a stable supply of abrasive particles to the nozzle assembly is essential to produce cuts of unvarying width.

Experiments have further proved that the supply of abrasive particles to the nozzle assembly 12 in the form of a suspension in accordance with the invention leads to materially less wear, and consequently a much longer life of the nozzle tip in comparison with the prior art. A study of FIG. 3 will make this advantage clear.

Figure 3:
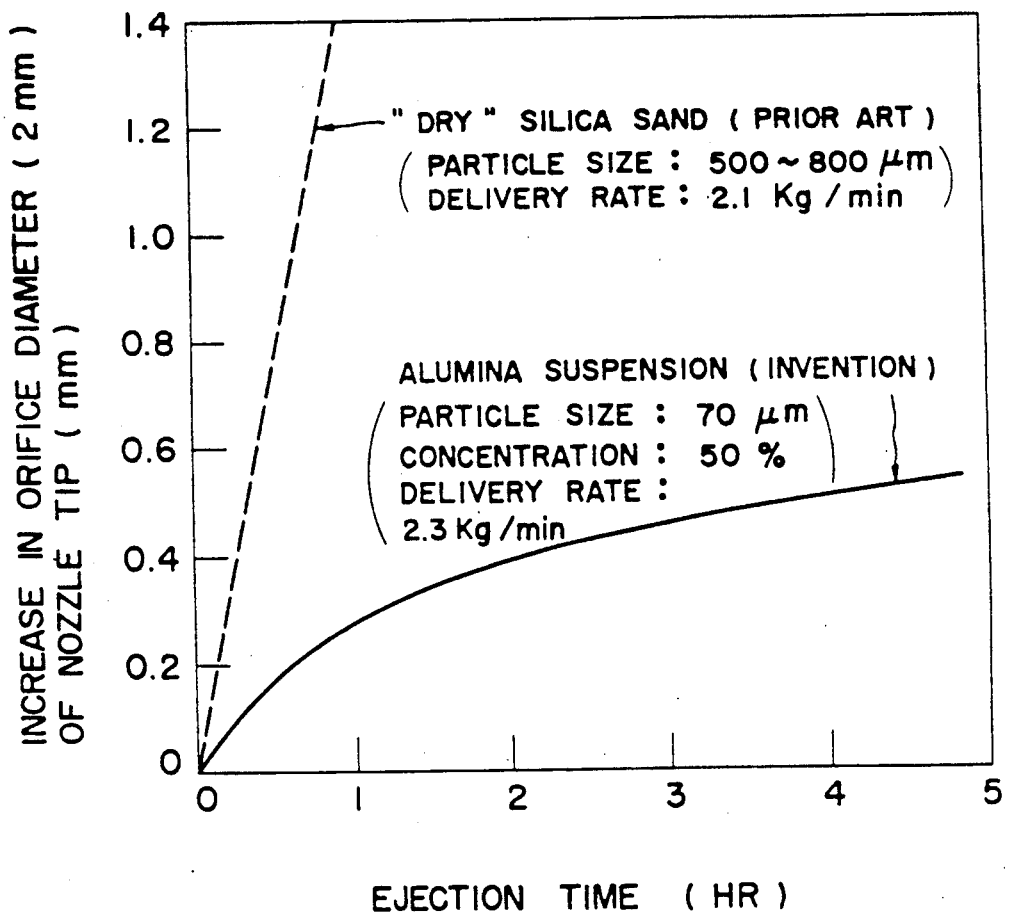
FIG. 3 is a graph plotting the curves of the wear (increase in orifice diameter) of the nozzle tips of abrasive water jet nozzle assemblies against the time of their operation, with the solid line curve representing the invention wherein abrasive particles are supplied in the form of a suspension, and the dashed curve representing the prior art arrangement wherein abrasive particles are supplied in a "dry" state.

The solid line curve in the graph of FIG. 3 indicates the wear of the nozzle tip with the lapse of time when a suspension of alumina particles with an average size of 70 microns and a concentration of 50 percent by weight was supplied at a rate of 2.3 kilograms per minute in accordance with the invention. The dashed curve in the same graph indicates the wear of the nozzle tip with the lapse of time when silica sand with a size of 500 to 800 microns is supplied in the "dry" state at a rate of 2.1 kilograms per minute in accordance with the prior art. The water pressure was 1500 kilograms per square centimeter in both cases. The useful life of the nozzle assembly, particularly of its tip, when used for metal cutting in accordance with the invention proved to be seven times as long as that of the nozzle assembly of the same construction used in accordance with the prior art.

Figure 4A:
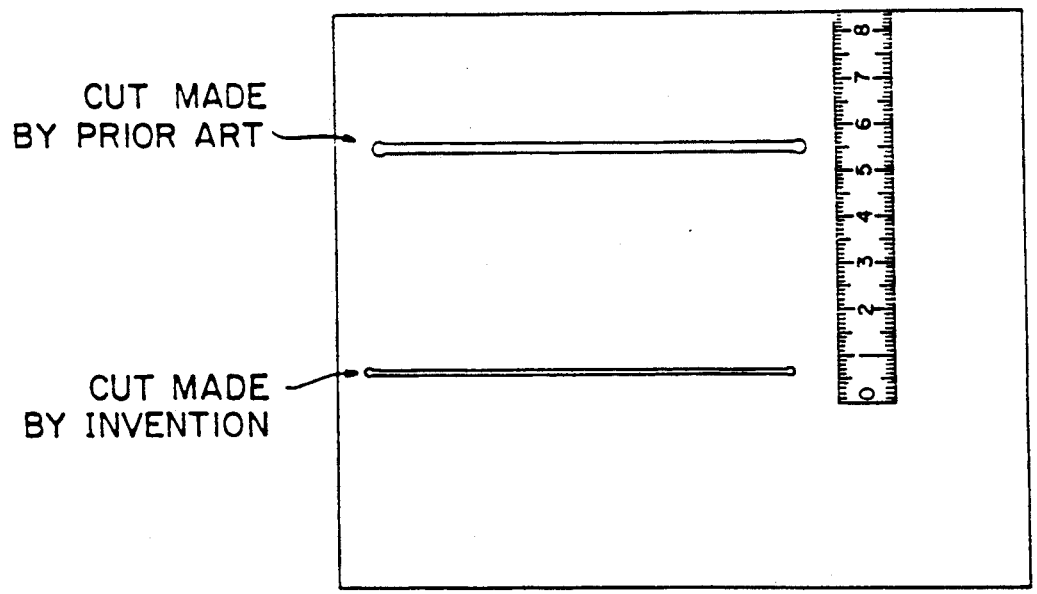
FIG. 4A is a photographic representation of cuts produced by the prior art arrangement and those in accordance with the invention.
Figure 4B:
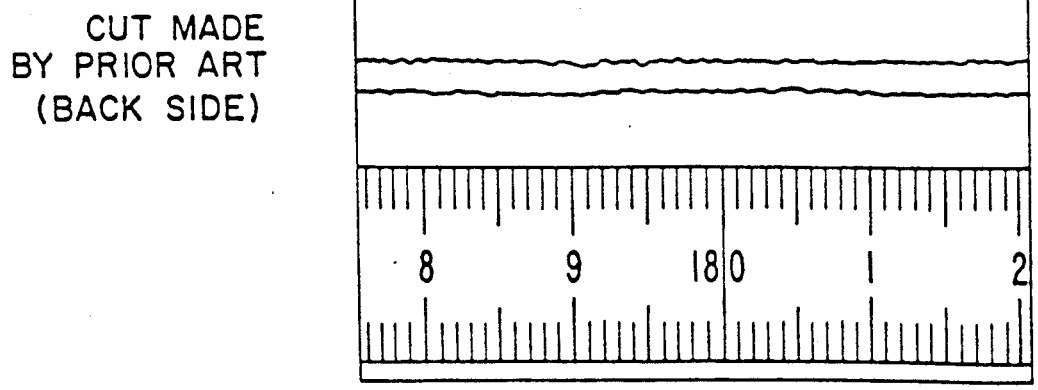
FIGS. 4B and 4C ar enlarged photographic views showing the back side of the cuts in FIG. 4A, produced by the prior art arrangement and by this invention.
Figure 4C:
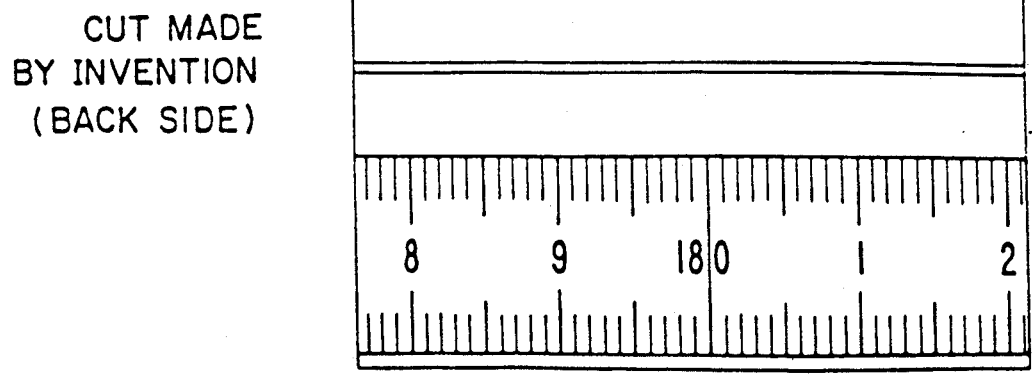

FIG. 4A is a representation of a cut made in a 1.0 millimeters thick stainless steel sheet in accordance with the invention, and of a cut made in the same work in accordance with the prior art ("dry" silica sand). Nozzle assemblies of the same tip orifice diameter were of course used for both cuts. It is evident that the kerf in accordance with the invention is far narrower than that in accordance with the prior art. Photographic views of FIGS. 4B and 4C indicate that burrs are present on the work cut in accordance with the prior art but not on the work cut in accordance with the invention.

Figure 5:
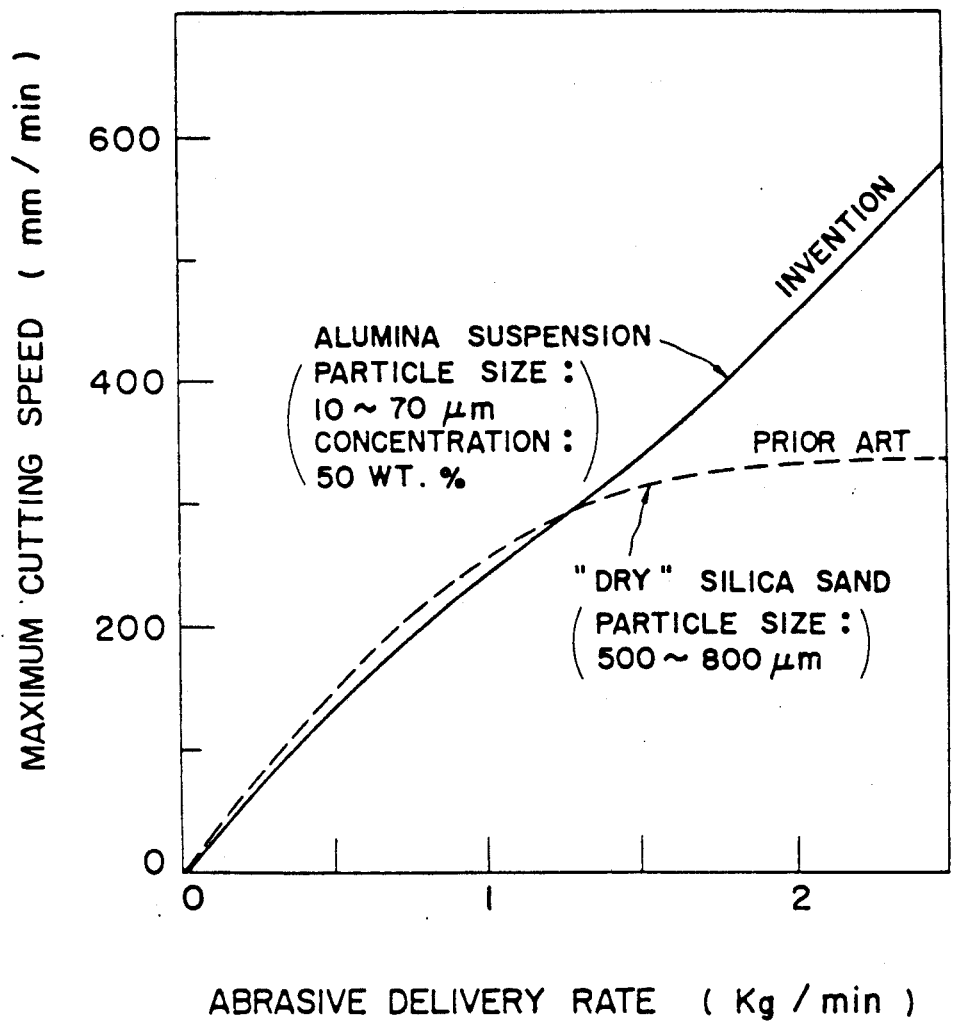
FIG. 5 is a graph plotting the curves of the maximum possible cutting speeds attainable against the rate of delivery of the abrasive particles, with the solid line curve representing the invention wherein the abrasive particles are supplied in the form of a suspension, and the dashed curve representing the prior art arrangement wherein the abrasive particles are supplied in a "dry" state.

FIG. 5 graphically demonstrates the relationship between the rate of delivery of abrasive particles to the nozzle assembly and the maximum possible cutting speed. The solid line curve represents the invention wherein a suspension of alumina particles with an average size of 10 to 70 microns was used with an abrasive concentration of 50 percent by weight. The dashed curve represents the prior art method employing "dry" silica sand with an average size of 500 to 800 microns. Conventionally, the common belief has been that the larger the size of abrasive particles in use, the higher is the cutting capability of an abrasive water jet, at least with respect to metal or similar ductile material. Contrary to this belief, the maximum possible cutting speed in accordance with the invention, employing much finer abrasive particles than heretofore, is approximately equal to that according to the prior art at relatively low rates of abrasive delivery and becomes progressively higher at greater rates of abrasive delivery. Needless to say the jet pressures were the same for the two methods.

3. Abrasive Water Jet Nozzle Assembly

Abrasive water jet nozzle assemblies heretofore used for introducing abrasive particles into a stream of ejected water have had one serious drawback. As the ejected water flows through an axial passageway in the conventional nozzle assembly, the abrasive particles travel through a radial path leading directly to the axial water passageway. So directed into the ejected water stream, the abrasive particles inevitably become unevenly dispersed therein and so cause localized wear of some parts of the nozzle assembly. Furthermore, water jets containing such unevenly dispersed abrasive particles tend to fail to produce exact cuts. The same inconveniences may manifest themselves if the abrasive particles are supplied in the form of a suspension in accordance with the invention. The following preferred construction of the nozzle assembly realizes an even dispersion of the abrasive particles in the ejected water stream.

Figure 6:
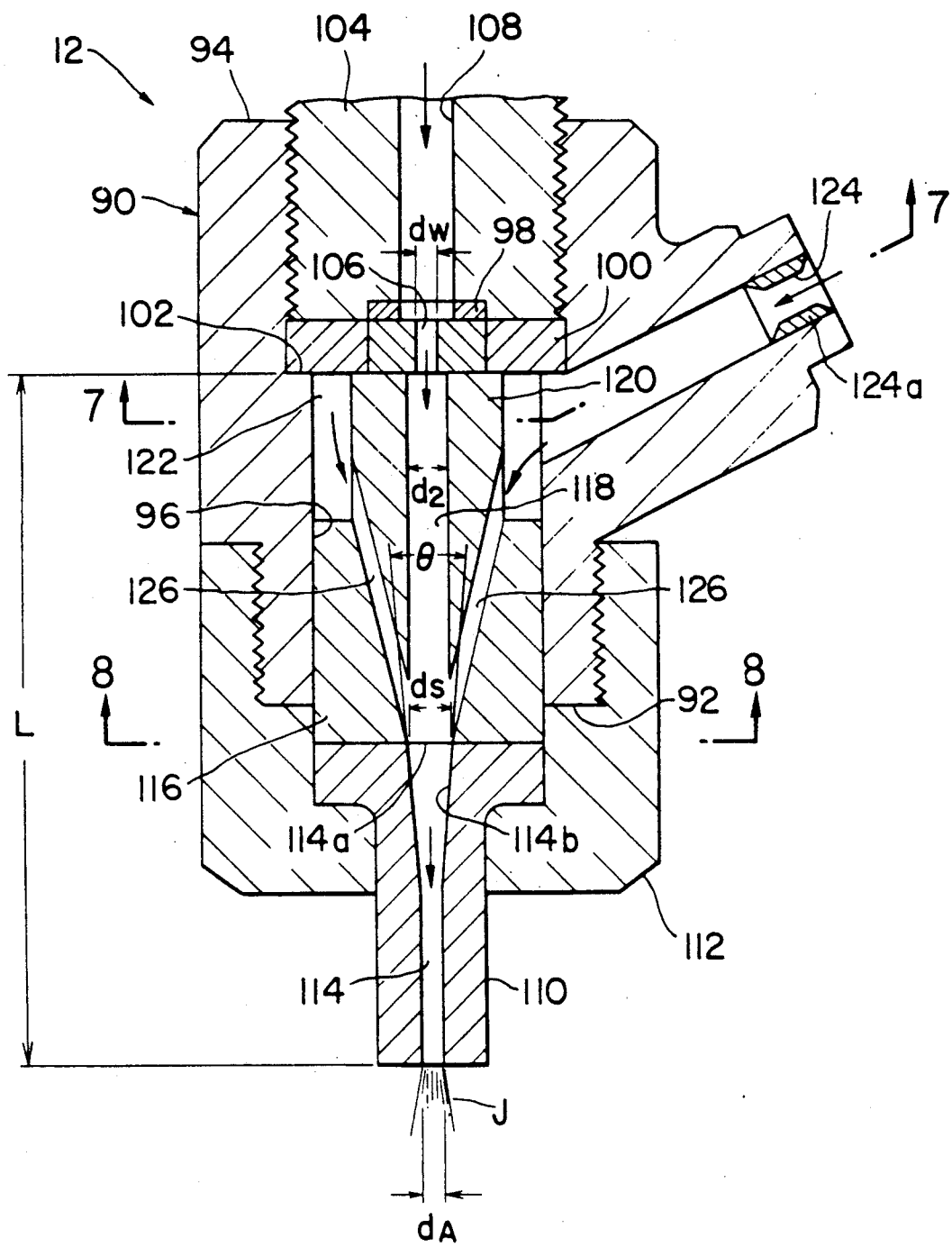
FIG. 6 is an enlarged axial section through the abrasive water jet nozzle assembly used in the apparatus of FIGS. 1 and 2.
Figure 7:
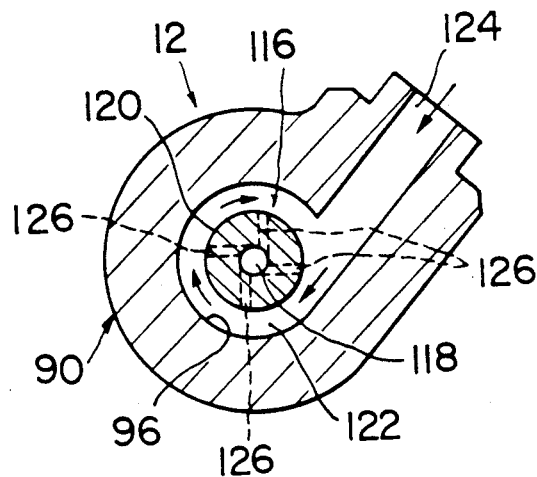
FIG. 7 is a cross section through the nozzle assembly of FIG. 6, taken along the line 7-7 therein.
Figure 8:
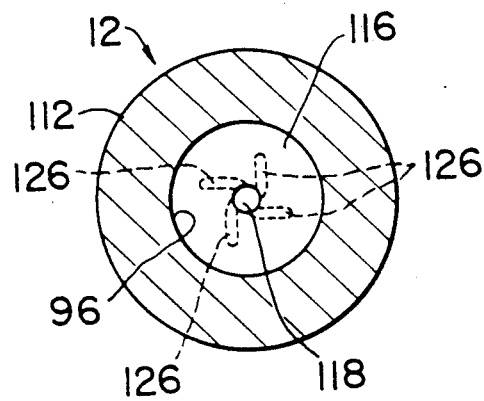
FIG. 8 is also a cross section through the nozzle assembly of FIG. 6, taken along the line 8-8 therein.

The abrasive water jet nozzle assembly 12 is shown in its first preferred form in FIGS. 6 through 8. With reference first and in particular to FIG. 6, the nozzle assembly 12 has a generally cylindrical nozzle body 90 having a tip end 92 directed toward the work W, FIG. 1 or 2, and a base end 94 away from the work. An axial bore 96 extends through the nozzle body 90 between the tip end 92 and base end 94.

In the axial bore 96 of the nozzle body 90, and adjacent the base end 94 thereof, there is mounted a pressurized water nozzle tip 98 which is held by a nozzle tip holder 100 in coaxial relation to the nozzle body. The nozzle tip holder 100 is held against an annular shoulder 102 of the nozzle body 90 by an adapter 104 inserted in the axial bore 96 from the base end 94 of the nozzle body. The adapter 104 protrudes outwardly from the base end 94 of the nozzle body 90 for connection of the nozzle assembly 12 to the conduit 16, FIGS. 1 and 2, leading to the pump 14. An orifice 106 in the pressurized water nozzle tip 98 communicates with the pump 14 via a water passageway 108 in the adapter 104.

Mounted on the tip end 92 of the nozzle body 90 is an abrasive water nozzle tip 110 which is retained in position by a nozzle cap 112 threadedly engaged with the nozzle body. The abrasive water nozzle tip 110 has an orifice 114 in axial alignment with the orifice 106 in the pressurized water nozzle tip 98. The abrasive water jet is to be expelled from this abrasive water nozzle tip 110.

An internal nozzle member 116 of generally cylindrical shape is mounted in the axial bore 96 in the nozzle body 90 and between the pressurized water nozzle tip 98 and the abrasive water nozzle tip 110. The internal nozzle member 116 has an ejected water passageway 118 extending axially therethrough. The passageway 118 is in alignment and direct communication with both the orifice 106 in the pressurized water nozzle tip 98 and the orifice 114 in the abrasive water nozzle tip 110.

It is thus seen that the pressurized water from the pump 14 flows through the rectilinear path comprising the passageway 108 in the adapter 104, the orifice 106 in the pressurized water nozzle tip 98, the passageway 118 in the internal nozzle member 116, and the orifice 114 in the abrasive water nozzle tip 110. The abrasive suspension is to be introduced into this stream of ejected water at the passageway 118 in the internal nozzle member 116, as will be explained in more detail hereafter.

As shown also in FIG. 7, the internal nozzle member 116 has a reduced diameter portion 120 to define, in combination with the nozzle body 90 and pressurized water nozzle tip holder 100, an abrasive suspension chamber 122 of annular or tubular shape concentrically surrounding the ejected water passageway 118 in the internal nozzle member 116. The nozzle body 90 has an abrasive suspension inlet port 124 leading to the abrasive suspension chamber 122 for the admission of the abrasive suspension S from its supply means 22 of FIG. 1 or the supply means 22a of FIG. 2. The inlet port 124 may have a throttling member 124a.

Preferably, and as shown in FIG. 7, the abrasive suspension inlet port 124 extends tangentially of the abrasive suspension chamber 122 as seen in the axial direction of the nozzle assembly 12. Consequently, the abrasive suspension on entering the abrasive suspension chamber 122 from the inlet port 124 whirls therein as indicated by the arrows in FIG. 7. While so whirling through the chamber 122, the abrasive suspension is to be drawn into the pressurized water passageway 118 in the internal nozzle member 116 through a plurality of, four in this particular embodiment, abrasive suspension passageways 126 in the internal nozzle member.

FIGS. 7 and 8 indicate that the abrasive suspension passageways 126 are disposed at constant angular spacings about the pressurized water passageway 118 in the internal nozzle member 116. Furthermore, preferably, the abrasive suspension passageways 126 extend tangentially to the pressurized water passageway 118, when the nozzle assembly 12 is viewed cross sectionally as in FIGS. 7 and 8. It will also be observed from FIG. 6 that each abrasive suspension passageway 126 has its entrance end disposed at the junction between the larger and smaller diameter portions of the internal nozzle member 116, and its exit end disposed adjacent the exit end of the pressurized water passageway 118. Each abrasive suspension passageway 126 is thus angled toward the tip end 92 of the nozzle body 90 as it extends from the abrasive suspension chamber 122 toward the ejected water passageway 118. Therefore, each abrasive suspension passageway 126 extends at a acute angle to the ejected water passageway 118 as seen in the axial section of the nozzle assembly as in FIG. 6, and in a tangential direction of the ejected water passageway 118 as seen in the cross section of the nozzle assembly as in FIGS. 7 and 8.

As clearly shown in FIG. 6, the ejected water passageway 118 has a constant diameter $d_2$, while the abrasive water orifice 114 has an upstream tapered portion 114b of diameter of which gradually increases toward an upstream opening 114a of the orifice 114 at which opening the orifice 114 is connected with the ejected water passageway 118. The diameter $d_s$ of the upstream opening 114a is equal to, or slightly smaller than, the diameter $d_2$ of the ejected water passageway 118.

An important feature of the junction between the passageway 118 and the orifice 114 is that the tapered portion 114b of the orifice forms a smooth continuation of the passageway 118 so as to enable production of a streamlined flow of the ejected water into the orifice 114 and that there is no enlarged mixing chamber in the zone of the junction, such an enlarged mixing chamber conventionally being provided for promoting intermixing of the ejected water and the abrasive supplied. It has been found that the angle $\theta$ of taper of the portion 114b should be equal to or less than 45° but greater than 0°. If the angle $\theta$ is greater than 45°, the speed of water ejected from the water nozzle orifice 106 will be reduced, while if the angle $\theta$ is less than 0° (i.e. negative), the flow of water from the water nozzle orifice 106 will be disturbed.

The abrasive suspension passageways 126 are directed toward the upstream opening 114a as shown, so that the flows of the abrasive suspension are allowed to smoothly join the streamlined flow of water in the ejected water passageway 118.

Discharged from the pressurized water nozzle tip 98 under extremely high pressure, the water flows through the axial passageway 118 in the internal nozzle member 116 at such a high velocity that a sufficient vacuum develops to draw the abrasive suspension into the passageway 118 via the passageways 126 in the internal nozzle member. The abrasive suspension is sufficiently agitated while whirling through the annular chamber 122, and flows through the passageways 126 disposed at constant angular spacings about the nozzle axis, so that the abrasive particles will be uniformly dispersed in the flow of the ejected water in the passageway 118. It is important that the flow of the ejected water from the passageway 118 to the orifice 114 is a streamlined flow without turbulence. This is ensured because of the smooth continuation from the passageway 118 to the orifice 114. Induced by the streamlined flow of water, the abrasive suspension from the passageways 126 joins the water flow without turbulence in the form of an outer layer of streamlined flow surrounding the streamlined flow of the ejected water, whereby a dual-layer flow of the water and the abrasive suspension is produced through the orifice 114 and is directed against the work. It will be understood that the ejected water flow and the abrasive suspension flow do not intermix and that the ejected water flow provides the energy to the flow of abrasive suspension surrounding the water flow, to cause the abrasive suspension to be directed against the work to cut the same.

It has been found to be preferable as a result of experimental tests for the diameter $d_2$ of the ejected water passageway 118 and the diameter $d_w$ of the water nozzle orifice 106 to satisfy the following relation.

$$d_2/d_w = 10 \text{ to } 20$$

Furthermore, it has been found that the diameter $d_A$ of the orifice 114 and the diameter $d_w$ should desirably satisfy the following relation.

$$d_A/d_w = 1.3 \text{ to } 6$$

The distance L between the downstream ends of the water nozzle orifice 106 and the abrasive water nozzle orifice 114 should preferably be from 50 to 100 millimeters.

The merging of the flow of abrasive suspension and the flow of ejected water as a dual-layer streamlined flow is advantageous in that it reduces deviation of the direction of the abrasive water jet from the nozzle tip 110, thus producing an abrasive jet substantially without divergence and in that the life of the nozzle tip 110 is prolonged because there is no turbulence of abrasive water flow which tends to produce wear of the tip, particularly at the upstream part of its orifice.

The use of the abrasive suspension such that abrasive particles with an average size of up to about 100 microns are held in suspension in water enables the production of the dual-layer streamlined flow mentioned above. The use of the very fine abrasive particles makes it possible to cause the abrasive suspension to smoothly join the ejected water flow and to reduce the diameter of the abrasive water nozzle tip so that the width of cut is reduced. Furthermore, because there is substantially no divergence of the abrasive water flow, the width of the cut of the work can be made equal to the diameter of the abrasive water nozzle orifice. According to a test, it was possible to make the width of cut as small as 0.5 millimeters. The use of the very fine abrasive particles further makes it possible to use a longer abrasive suspension supply line with a stable conveying characteristic than heretofore. It has been confirmed that the abrasive suspension can be supplied as far as 20 meters. When a larger size of abrasive particles is used, clogging of the pipeline tends to occur. Furthermore, the very fine abrasive particles in the suspended state do not settle in short time so that separation of the abrasive particles and the water can be prevented. This is particularly so when the abrasive water passes through a curved path, such as the annular abrasive suspension chamber 122, under centrifugal force. If separation of the abrasive particles from the water occurs, good cutting performance is not obtained.

Figure 9:
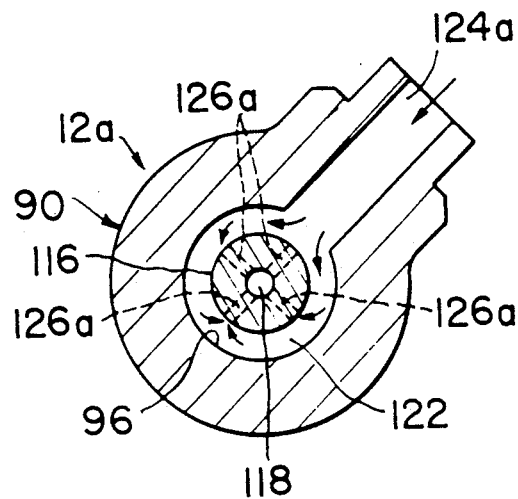
FIG. 9 is a view similar to FIG. 7 but showing an alternative form of abrasive water jet nozzle assembly.

FIG. 9 shows a second preferred form of abrasive water jet nozzle assembly 12a, which in fact is a slight modification of the first described nozzle assembly 12 of FIGS. 6 through 8. The modified nozzle assembly 12a differs from the original nozzle assembly 12 in that the abrasive suspension inlet port 124a extends radially of the nozzle body 90, rather than tangentially to the abrasive suspension chamber 122. Another difference is that the abrasive suspension passageways 126a extend radially of the internal nozzle member 116, rather than tangentially of the pressurized water passageway 118. The other details of construction are exactly as set forth previously in connection with the nozzle assembly 12 of FIGS. 6 through 8.

An even dispersion of the abrasive particles in the stream of pressurized water can be realized even if the abrasive suspension inlet port 124a and abrasive suspension passageways 126a do not extend tangentially to the abrasive suspension chamber 96 and ejected water passageway 118, respectively, as in this nozzle assembly 12a. The modified nozzle assembly 12a is meant to illustrate the fact that a minimal requirement for the even dispersion of the abrasive particles in the stream of pressurized water is that the abrasive suspension passageways 126a be disposed at constant angular spacings about the ejected water passageway 118.

Both the nozzle assembly 12 of FIGS. 6 through 8 and the nozzle assembly 12a of FIG. 9 are subject to additional modifications within the scope of this invention.

What is claimed is:

1. An apparatus for cutting a work by means of an abrasive water jet containing abrasive particles, comprising:
   (a) a source of water under pressure;
   (b) abrasive suspension supply means for supplying an abrasive suspension such that abrasive particles with an average size of up to about 100 microns are held in suspension in water; and
   (c) an abrasive water jet nozzle assembly to be held opposite the work to be cut and communicating with both the pressurized water source and the abrasive suspension supply means, the nozzle assembly mixing he pressurized water and the abrasive suspension for directing the resulting mixture against the work as an abrasive water jet, said jet nozzle assembly including a nozzle body having a rectilinear through path made up of a water passageway, a water ejecting orifice disposed downstream of said water passageway, an ejected water passageway disposed downstream of said orifice, and an abrasive water orifice disposed downstream of said ejected water passageway, said abrasive water orifice having an upstream opening of a diameter equal to, or slightly smaller than, a diameter of said ejected waver passageway, said upstream opening being joined with a downstream portion of said ejected water passageway in such a manner that said abrasive water orifice includes an upstream tapered portion having a diameter that increases gradually toward said upstream opening and forms a smooth continuation of said ejected water passageway to produce a streamlined flow of the ejected water, said nozzle body further having an abrasive suspension inlet port connected to the abrasive suspension supply means, an annular abrasive suspension chamber disposed around said through path and connected to said inlet port, and a plurality of abrasive suspension passageways communicatively connecting said abrasive suspension chamber to said downstream portion of said ejected water passageway where said ejected water passageway is joined with said upstream opening of said abrasive water orifice, said abrasive suspension passageways being directed toward said upstream opening and having walls which merge with said upstream tapered portion of said abrasive water orifice to supply the abrasive suspension into said upstream opening in the form of an outer layer of streamlined flow of the abrasive suspension, surrounding the streamlined flow of the ejected water, whereby a dual-layer flow of the water and the abrasive suspension is produced through said abrasive water orifice.

2. The abrasive water jet cutting apparatus of claim 1, wherein said water passageway and said water ejecting orifice are formed in an adapter provided at an upstream end of the nozzle body.

3. The abrasive water jet cutting apparatus of claim 1, wherein said ejected water passageway is formed through an internal nozzle member fitted within an axial bore of said nozzle body so as to define said abrasive suspension chamber between said nozzle member and said nozzle body, said abrasive suspension passageways being also formed in said internal nozzle member.

4. The abrasive water jet cutting apparatus of claim 1, wherein said abrasive water orifice is formed through a nozzle tip fitted in a downstream end of said nozzle body.

5. The abrasive water jet cutting apparatus of claim 1, wherein said abrasive suspension inlet port extends tangentially to said abrasive suspension chamber.

6. The abrasive water jet cutting apparatus of claim 1, wherein said abrasive suspension passageways extend tangentially to said ejected water passageway.

7. The abrasive water jet cutting apparatus of claim 1, wherein said upstream tapered portion has an angle of taper equal to or less than 45° and greater than 0°.

8. The abrasive water jet cutting apparatus of claim 1 wherein the diameters of said ejected water passageway and said water ejecting orifice have a relationship defined by $$d_2/d_w = 10 \text{ to } 20$$

where $d_2$ is said diameter of the ejected water passageway and $d_w$ is said diameter of the water ejecting orifice.

9. The abrasive water jet cutting apparatus of claim 1, wherein the diameters of said abrasive water orifice and said water ejecting orifice have a relationship defined by $$d_4/d_2 = 1.3 \text{ to } 6$$

where $d_4$ is said diameter of said abrasive water orifice and $d_w$ said diameter of the water ejecting orifice.

10. The abrasive water jet cutting apparatus of claim 9, wherein said distance between a downstream end of said water ejecting orifice and a downstream end of said abrasive water orifice is from 50 to 500 millimeters.

11. An apparatus for cutting a work by means of an abrasive water jet containing abrasive particles, comprising:
   (a) a source of water under pressure;
   (b) abrasive suspension supply means for supplying an abrasive suspension such that abrasive particles with an average size of up to about 100 microns are held in suspension in water; and
   (c) an abrasive water jet nozzle assembly to be held opposite the work to be cut and communicating with both the pressurized water source and the abrasive suspension supply means, the nozzle assembly mixing the pressurized water and the abrasive suspension for directing the resulting mixture against the work as an abrasive water jet, said nozzle assembly comprising:
      (i) a nozzle body having a tip end to be directed toward the work and a base end to be directed away from the work, said nozzle body having an axial bore extending between said base end and said tip end;

(ii) a pressurized water nozzle tip mounted in said axial bore of said nozzle body and adjacent said base end thereof and having an orifice in communication with the pressurized water source;

(iii) an abrasive water nozzle tip mounted on said tip end of said nozzle body and having an orifice in alignment with said orifice of the pressurized water nozzle tip;

(iv) an internal nozzle member mounted in said axial bore of said nozzle body and between said pressurized water nozzle tip and said abrasive water nozzle tip and having defined therethrough an ejected water passageway in alignment and communication with said orifices of said pressurized water nozzle tip and said abrasive water nozzle tip;

(v) an abrasive suspension inlet port defined in said nozzle body for the admission of the abrasive suspension from the abrasive suspension supply means;

(vi) an abrasive suspension chamber of annular shape defined between said nozzle body and said internal nozzle member so as to surround said ejected water passageway in said internal nozzle member, said abrasive suspension chamber being in communication with said abrasive suspension inlet port in said nozzle body;

(vii) a plurality of abrasive suspension passageways defined in said internal nozzle member for communicating said abrasive suspension chamber with said ejected water passageway, said abrasive suspension passageways being angularly spaced from one another about said ejected water passageway; and (viii) said orifice of said abrasive water nozzle tip having an upstream opening of a diameter equal to, or slightly smaller than, a diameter of said ejected water passageway, said upstream opening being joined with said ejected water passageway in such a manner that said orifice of the abrasive water nozzle tip includes an upstream tapered portion having a diameter that increases gradually toward said upstream portion and forms a smooth continuation of said ejected water passageway to produce a streamlined flow of the ejected water, said abrasive suspension passageways being joined with said ejected water passageway so as to be directed to said upstream opening and having walls which merge with said upstream tapered portion of said orifice of said abrasive water nozzle tip to supply the abrasive suspension into said upstream opening in the form of an outer layer of streamlined flow of the abrasive suspension, surrounding the streamlined flow of the ejected water.

* * * * *